UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

BLUE TRISAZO COLORING-MATTER.

1,125,050.  Specification of Letters Patent.  Patented Jan. 19, 1915.

No Drawing.   Application filed April 21, 1914.   Serial No. 833,489.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Blue Trisazo Coloring-Matter, of which the following is a specification.

The present invention relates to the manufacture of new azo dyestuffs capable of dyeing cotton in blue shades which by an after treatment with formic aldehyde are rendered fast to washing.

The process for producing the new dyes consists in combining a diazotized acidyl diamin or a nitro-amin with a suitable alpha-naphthylamin compound capable of being diazotized after combination, rediazotizing the azo dye obtained, combining it with the same or another of such a middle component, rediazotizing, combining with resorcin, eliminating the acidyl radical from the acidyl compounds or reducing the nitro group. The coloring matters thus produced are after being dried and pulverized in the shape of their alkaline salts dark powders soluble in water; yielding upon treatment with stannous chlorid and hydrochloric acid a diamin, an 1.4-naphthylenediamin and aminoresorcin. They dye cotton in generally blue shades which can be developed on the fiber with formic aldehyde, blue shades being obtained of very good fastness to washing.

In order to illustrate the new process more fully the following example is given, the parts being by weight:—18 parts of monooxlyl-para-phenylenediamin $$(NH_2-C_6H_4-NH-CO-COOH)$$

are dissolved in 3000 parts of water containing 5.3 parts of sodium carbonate, 35 parts of hydrochloric acid of 19° Bé. are added and the mixture after being cooled to 5° C. is diazotized with 6.9 parts of sodium nitrite. The resulting diazo compound is introduced into a solution of 24.5 parts of 1-naphthylamin-7-sulfonate of sodium containing 15 parts of a 100 per cent. sodium acetate. The mixture is rendered alkaline with caustic soda. A solution of 7.5 parts of sodium nitrite and 80 parts of hydrochloric acid are added. The diazo compound is filtered off, stirred up with acid water and added to a solution of 24.5 parts of 1-naphthylamin-7-sulfonic acid (sodium salt) in 500 parts of water and 100 parts of a sodium acetate solution (25 per cent.). After an hour the mixture is neutralized with $Na_2CO_3$ and is stirred for 12 hours. Subsequently 80 parts of hydrochloric acid and 7.5 parts of nitrite are added and the mixture is stirred for 4 hours. The diazo compound is filtered off, stirred up with water and added to a solution of 11 parts of resorcin in 400 parts of water and 20 parts of calcined soda. The dye is precipitated with common salt and filtered off. It is then stirred up with 1200 parts of boiling water and the solution in order to eliminate the oxalyl group is heated to boiling for 10 minutes with 170 parts of a 30 per cent. caustic soda lye, then cooled to 70° C. and the excess NaOH neutralized with acid. The dye is salted out, filtered off and dried.

The new coloring matter is after being dried and pulverized in the shape of its sodium salt a dark powder soluble in water with a reddish-black coloration, soluble in concentrated sulfuric acid with a green coloration, yielding upon treatment with stannous chlorid and hydrochloric acid paraphenylenediamin, 1.4-diaminonaphthalene-7-sulfonic acid and aminoresorcin. It dyes cotton in blue shades, which when developed with formic aldehyde change into blue shades of excellent fastness to washing. The new dye has in a free state most probably the formula:

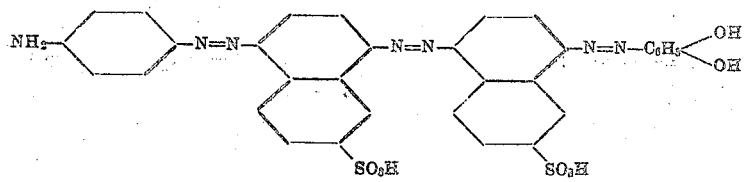

Instead of oxalyl-para-phenylenediamin other acidyl diamins or their sulfonic acids e. g. monoacidyl derivatives of chloro-para-phenylenediamin, chloro-ethoxy-para-phenylenediamin, dianisidin, meta-phenylenediamin, para-phenylenediamin sulfonic acid, 1.4-naphthylenediamin sulfonic acid, meta-phenylenediamin sulfonic acid, meta-toluylenediamin sulfonic acid can be used.

The 1.7-naphthyl-amin sulfonic acid can be replaced by other middle components, such as the 1.6-naphthylamin sulfonic acid, alpha-naphthylamin and aminonaphtholethers or aminonaphtholether sulfonic acids.

We claim:—

1. The herein described new trisazo dyestuffs, obtainable from a diazotized acidyl diamin, two molecules of a suitable alpha-naphthylamin compound and resorcin, which dyes are after being dried and pulverized in the shape of their alkaline salts dark powders soluble in water; yielding upon treatment with stannous chlorid and hydrochloric acid a diamin, an 1.4-naphthylenediamin and aminoresorcin; dyeing cotton generally in blue shades which can be developed on the fiber with formic aldehyde, shades of very good fastness to washing being obtained, substantially as described.

2. The herein described new trisazo dyestuffs, obtainable from a diazotized acidyl diamin, two molecules of a suitable alpha-naphthylamin sulfonic acid and resorcin, which dyes are after being dried and pulverized in the shape of their alkaline salts dark powders soluble in water; yielding upon treatment with stannous chlorid and hydrochloric acid a diamin, an 1.4-naphthylenediamin sulfonic acid and amino-resorcin; dyeing cotton generally in blue shades which can be developed on the fiber with formic aldehyde, shades of very good fastness to washing being obtained, substantially as described.

3. The herein described new trisazo dyestuffs, obtainable from a diazotized acidyl paraphenylenediamin, two molecules of a suitable alpha-naphthylamin compound and resorcin, which dyes are after being dried and pulverized in the shape of their alkaline salts dark powders soluble in water; yielding upon treatment with stannous chlorid and hydrochloric acid a paraphenylenediamin, an 1.4-naphthylenediamin and amino-resorcin; dyeing cotton generally in blue shades which can be developed on the fiber with formic aldehyde, shades of very good fastness to washing being obtained, substantially as described.

4. The herein described new trisazo dyestuffs, obtainable from a diazotized acidyl paraphenylenediamin, two molecules of a suitable alpha-naphthylamin sulfonic acid and resorcin, which dyes are after being dried and pulverized in the shape of their alkaline salts dark powders soluble in water; yielding upon treatment with stannous chlorid and hydrochloric acid a paraphenylenediamin, an 1.4-naphthylenediamin sulfonic acid and amino-resorcin; dyeing cotton generally in blue shades which can be developed on the fiber with formic aldehyde, shades of very good fastness to washing being obtained, substantially as described.

5. The herein described new trisazo dyestuff, obtainable from monooxalyl-paraphenylenediamin, 1-naphthylamin-7-sulfonic acid and resorcin, which dye is after being dried and pulverized in the shape of its sodium salt a dark powder having in a free state most probably the formula:

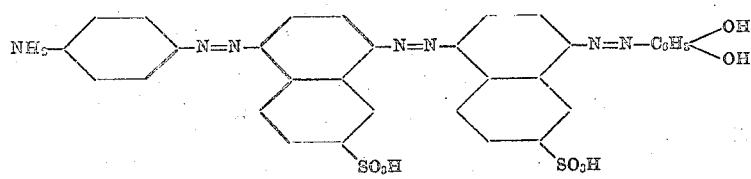

soluble in water with a reddish-black coloration, soluble in concentrated sulfuric acid with a green coloration; yielding upon treatment with stannous chlorid and hydrochloric acid para-phenylenediamin, 1.4-diaminonaphthalene-7-sulfonic acid and aminoresorcin; dyeing cotton in blue shades, which can be rendered fast to washing by developing them with formic aldehyde, substantially as described.

In testimony whereof we have hereunto set our hands in the presence of two subscribing witnesses.

AUGUST BLANK.
CARL HEIDENREICH.
JOHANNES JANSEN.

Witnesses:
    LOUIS VANDORN,
    HANS BRÜCKNER.